United States Patent [19]

Yamada et al.

[11] Patent Number: 4,489,927
[45] Date of Patent: Dec. 25, 1984

[54] SLIDE WEDGE CLAMP

[75] Inventors: Sohei Yamada; Ichiro Miyata, both of Itamishi, Japan

[73] Assignee: Aioi Seiki Kabushiki Kaisha, Japan

[21] Appl. No.: 422,846

[22] Filed: Sep. 24, 1982

[30] Foreign Application Priority Data

Feb. 19, 1982 [JP] Japan .............................. 57-23042[U]

[51] Int. Cl.³ .............................................. B23Q 3/02
[52] U.S. Cl. .................................................... 269/137
[58] Field of Search .................. 269/134, 137, 138, 91, 269/93

[56] References Cited

U.S. PATENT DOCUMENTS

| 2,667,799 | 2/1954 | Rzepela | 269/138 |
| 3,090,612 | 5/1963 | Rouse | 269/137 |
| 3,406,958 | 10/1968 | Geneloni et al. | 269/137 |
| 3,512,769 | 5/1970 | Pendry et al. | 269/138 |
| 4,049,253 | 9/1977 | Mandel | 269/137 |

FOREIGN PATENT DOCUMENTS

| 1039553 | 5/1953 | France. | |
| 614954 | 12/1948 | United Kingdom. | |
| 938404 | 10/1963 | United Kingdom | 269/137 |

Primary Examiner—Robert C. Watson
Attorney, Agent, or Firm—Bacon & Thomas

[57] ABSTRACT

A slide wedge clamp for clamping workpieces to a mounting face such as the work table of a machine tool. A work-engaging member is secured to the mounting face by a fixing bolt set perpendicular thereto. By screwing up a clamping bolt set downward through a clamping block with its rearward and downward facing driven wedge face in contact with its forward and upward facing driving counterpart wedge face on the work-engaging member, the clamping block is driven forward and downward for clamping. By providing a raised workpiece-carrying portion on the forward end side of the clamping block, it is possible to clamp workpieces in a raised state.

6 Claims, 15 Drawing Figures

SLIDE WEDGE CLAMP

BACKGROUND OF THE INVENTION

The present invention relates generally to a clamping device which may be used in connection with a machine tool for clamping a workpiece or tool on a machine's table. More particularly, it relates to a slide wedge clamp which is provided with a clamp bolt to be fastened manually. The force applied for screwing it up is transmitted and magnified through a slide wedge mechanism which can powerfully clamp a workpiece.

Figure 15:
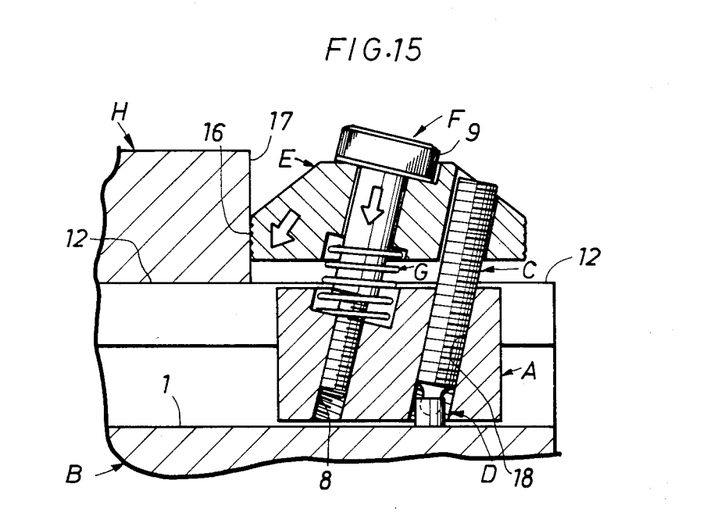
FIG. 15 is a vertical sectional side view of the toe clamp quoted as a prior art.

A device which is similar to the clamp of the present invention is disclosed in FIG. 15 of U.S. Pat. No. 4,049,253 and is known as the toe clamp.

This toe clamp consists of a work-engaging member E disposed above a T-shaped groove 1 in the top 12 of a table B of a milling machine and a nut A disposed in the T-sectioned groove 1. When a clamping screw C is screwed into the nut A, the nut A is lifted after the advancing screw C comes into contact with a swivel head D and its shoulder is pressed against the mating shoulder of the T-shaped groove 1 so that the nut A is fixed relative to the table B. Shoulder bolt F is screwed into the threaded bore 8 of the nut A to drive forward the work-engaging member E as it is pressed down by the bolt 9. A workpiece H is clamped by the forward end 16 of the work-engaging member E which is in contact with side 17 of the workpiece.

This toe clamp, however, is known to have the following defects:

(a) Since the shoulder bolt F and the clamping screw C are set through the work-engaging member E in an inclined orientation, it is rather difficult to fasten them. This is especially true in the case of a horizontal machine tool with its box-shaped work pallet because the workpiece H has to be clamped to a vertical side of the pallet and the clamping screw C has to be screwed diagonally upward. The workability is then particularly unfavourable.

Moreover, the bolt bore and threaded bores 8 and 18 have to be provided in the work-engaging member E and nut A inclined. This adds to their manufacturing costs.

(b) Since the workpiece H to be clamped is directly placed on the top of the table B, vertical drilling work on it is likely to result in injury of the table B by the drill tip. Therefore, this device is less suited for clamping of this kind of workpieces which are to be vertically drilled.

(c) Since the working mechanism is such that the work-engaging member E is driven forward as it is pressed down to clamp the workpiece H, the bottom of the work-engaging member E cannot be supported by the top of the table B, and the work-engaging member E has to be retained in a raised state. Hence, the portion of shoulder bolt F which runs through the compression spring G is subjected a high bending moment as well as a tensile load. This interferes with the powerful clamping action which is desired.

SUMMARY OF THE INVENTION

It is the principal object of the present invention to provide an arrangement which facilitates the fastening of a clamp's fixing bolt and clamping bolt so as to improve its working efficiency and at the same time lower its manufacturing cost.

To achieve this object a work-engaging member is provided with a fixing bolt and a clamping bolt which are perpendicular to a mounting face. The work-engaging member has a bore to accomodate the fixing bolt which is perpendicular to its seating face. The fixing bolt is set through this accomodating bore and has its leg screwed into the threaded bore provided in the mounting face so that the work-engaging member is secured to the mounting face. With the driven wedge face of the clamping block in contact with its driving counterpart in the work-engaging member, the clamping bolt is tightened to force down the clamping block. The clamping block is driven forward for clamping as the driven wedge face slides down on its driving counterpart. Like the fixing bolt, the clamping bolt is set perpendicular to the seating face of the work-engaging member.

Another object of the present invention is to clamp each workpiece raised off the mounting face so as to enable it to be bored.

This is accomplished through the use of a raised workpiece-carrying portion on the forward end of the work-engaging member. Its topside is used as a workpiece carrying face so that the workpiece can be clamped on the workpiece-carrying face in a raised state.

Still another object of the present invention is to increase the force with which the workpiece is clamped, while improving the clamp's durability.

This is accomplished by the following arrangement. With the clamping block's driven wedge face in contact with its driving counterpart of the work-engaging member, the clamping block is forced down by the clamping bolt, and the clamping block is driven forward and downward to clamp the workpiece therefore, the clamping bolt not subjected to any bending moment. It is thereby possible to increase the tensile force in the clamping bolt so as to increase the clamping force of the device.

Further, if necessary, it is possible to extend the leg portion of the clamping bolt downward beyond the seating face of the work-engaging member so that it can be screwed into the threaded bore provided on the mounting face side. This allows the work-engaging member to be secured more powerfully by the fastening force applied to the clamping bolt.

BRIEF DESCRIPTION OF THE DRAWINGS

FIGS. 1-14 relate to embodiments of the present invention, while FIG. 15 is given to illustrate the quoted prior art.

DETAILED DESCRIPTION OF THE PREFERRED EMBODIMENT

Referring to the appended drawings, embodiments of the present invention are described below.

A principal embodiment of the invention is shown in FIGS. 1-8.

Figure 1:
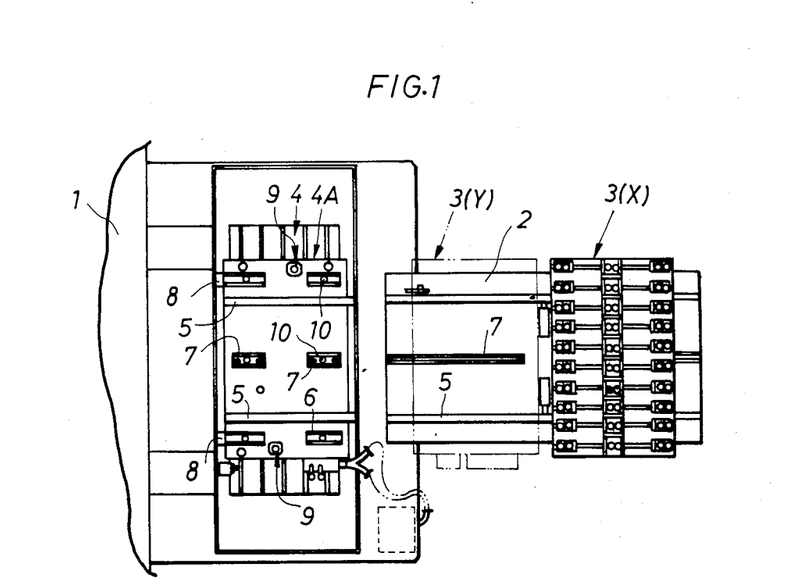
FIG. 1 is a plan view showing a turntable and the essential parts of a vertical machine tool located in front thereof.
Figure 2:
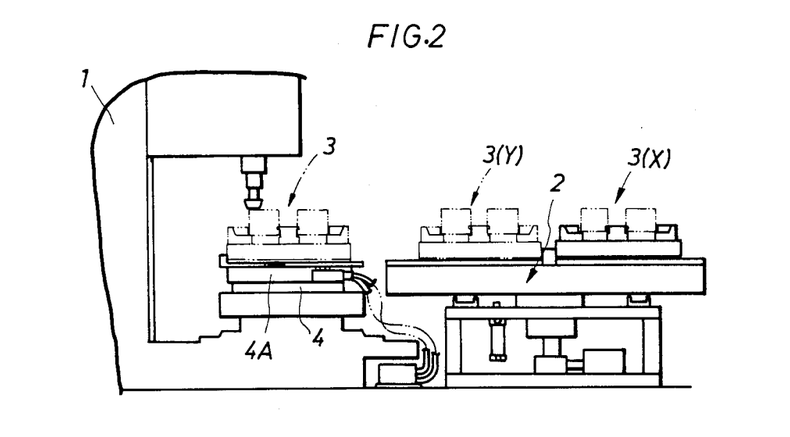
FIG. 2 is a side view corresponding to FIG. 1.

An NC (numerically controlled) vertical machine tool 1 is located in front of a horizontally rotating turntable 2. An auxiliary table 4A is detachably secured to table 4 and a work-clamp pallet 3 with unfinished workpieces set thereon is brought onto this auxiliary table 4A and fixed thereon so that the workpieces can be machined.

While the machining of workpieces is under way, finished workpieces are removed from and unfinished workpieces are positioned and clamped on another work-clamp pallet 3 in a workpiece-exchanging station X on the turntable 2.

Upon completion of machining of the workpieces set on the work-clamp pallet 3 on the auxiliary table 4A of the machine tool 1, the work-clamp pallet 3 is brought out to a work-clamp pallet exchanging station Y on the turntable 2. Turntable 2 is then rotated by a half a turn to shift the work-clamp pallet 3 with unfinished works set thereon to the clamp-pallet exchanging station Y to be subsequently brought onto the auxiliary table 4A so that the workpieces can be machined.

Thus, by the use of the auxiliary table 4A and the turntable 2, the time required for exchanging workpieces can be substantially shortened for a marked improvement of the working efficiency of the machine tool 1.

Figure 3:
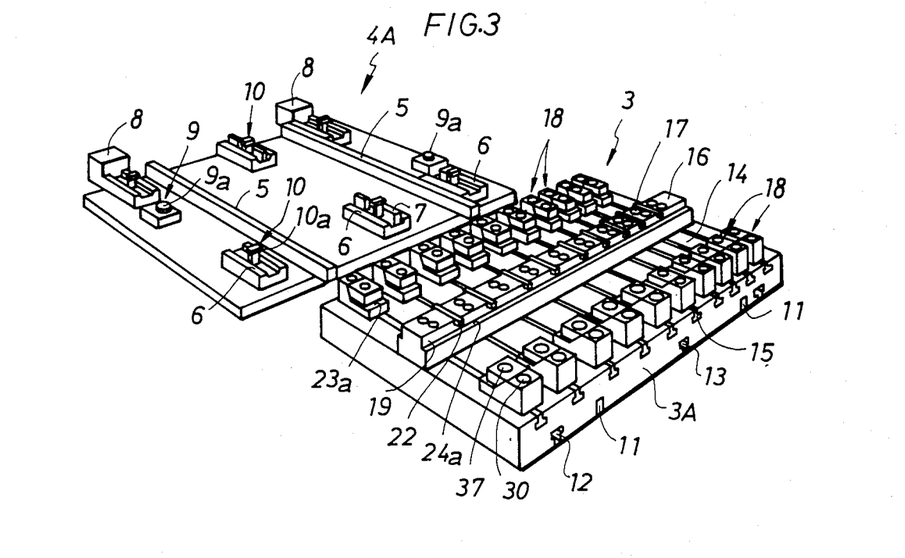
FIG. 3 is a perspective view of an auxiliary table and a work-clamp pallet with a forward and a rear row of 10 sets of clamps.

As shown in FIG. 3, the auxiliary table 4A has arranged thereon transport rails 5, guide rails 7, stoppers 8, positioning devices 9, hydraulic clamping devices 10 and supporting blocks 6.

The work-clamp pallet 3 has castor means supported by springs arranged in the square-sectioned grooves 11 provided in the underside of its base block 3A. The clamp-pallet 3 with the castor means travels on the transport rails 5 onto the auxiliary table 4A.

When the work-clamp pallet 3 has been stopped by the stoppers 8, the plugs 9a of the pair of left and right positioning devices 9 rise to fit into the mating holes in the underside of the base block 3A for accurate positioning of the work-clamp pallet 3 longitudinally as well as laterally. The clamping devices 10 pull down clamping blocks 10a which are loosely fitted in clamping grooves 12 in the base block 3A to clamp the base block 3A on the supporting blocks 6. Guide groove 13 is used to accommodate the guide rails which slide therein.

Figure 5:
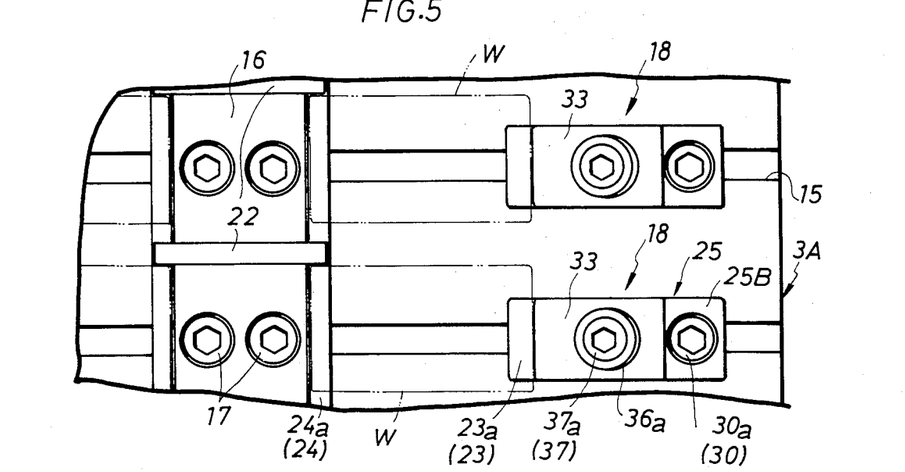
FIG. 5 is a plan view of the essential parts of the work-clamp pallet including that of the clamp.
Figure 6:
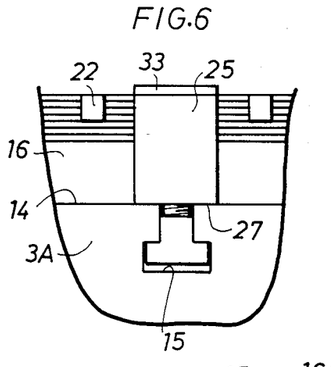
FIG. 6 is a rear view of the essential parts of the work-clamp pallet including that of the clamp.

In the topside 14 of the base block 3A of the work-clamp pallet 3, there are 10 longitudinal T-sectioned grooves 15 at fixed lateral intervals. Along the center of the base block's topside 14 there is a lateral continuous workpiece-positioning block 16 fixed by a pair of fixing bolts screwed into mating nuts in each T-sectioned groove 15. On both sides of this positioning block 16 there are provided across workpiece-accommodating spaces 10, sets of clamping devices 18 opposite each workpiece-positioning face 19 of positioning block 16. Each clamping device 18 is removably fixed in place with its fixing bolt 30 and clamping bolt 37 screwed into a mating nut in each T-sectioned groove 15.

Figure 4:
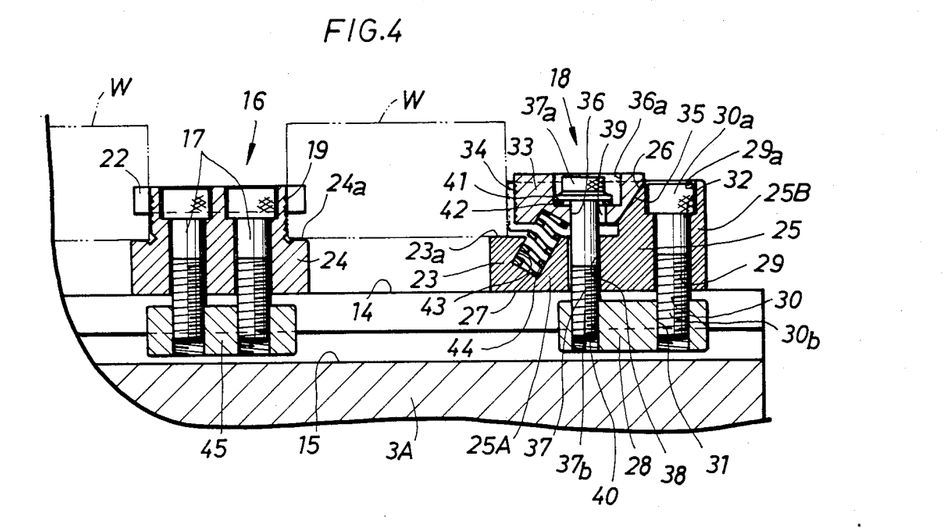
FIG. 4 is a vertical sectional side view of the essential parts of the work-clamp pallet including that of a clamp according to the present invention.

Workpiece-positioning members 22 are removably fitted in the square-sectioned grooves which are provided longitudinally at a fixed pitch in the top of the positioning block 16. It is so arranged that each workpiece is placed bridgelike on and between a workpiece-carrying face 23a of each clamping device 18 and its counterpart 24a of the positioning block 16 with its inward lateral side in contact with the workpiece positioning face 19 and its one longitudinal side checked by the workpiece-positioning member 22. Thus, each workpiece W is precisely positioned longitudinally, laterally and in height to be subsequently clamped in place by the clamping device 18.

In case of a large-sized workpiece W, the workpiece-positioning members 22 can be removed as necessary and it is possible to use a plurality of clamping devices 18 for one workpiece W. It is further possible to adjust the longitudinal position of each clamping device 18 as necessary.

Since workpieces W are set on both sides of the positioning block 16 symmetrically and these workpieces W are pushed against the positioning block 16 from both sides thereof, there is no risk of the positioning block 16 being longitudinally deformed or displaced. Hence, each workpiece W can be precisely positioned in the coordinate system on the mounting face 14.

If necessary, it is also possible to remove the positioning block 16 so as to clamp each workpiece W between a longitudinal pair of clamping devices 18.

The construction of the clamping device 18 is the object of the present invention and is described below in greater detail.

As shown in FIG. 4, the work-engaging member 25 has formed in its upper and longitudinally mid-portion a forward and upward facing driving wedge face 26. The part in front of it constitutes a stepped-down portion 25A and the part behind it constitutes a stepped-up portion 25B. The underside of the work-engaging member 25 constitutes a horizontal seating face 27.

The work-engaging member 25 has its seating face 27 in contact with the mounting face 14 of the base block 3A and is disposed above the T-sectioned groove provided in the mounting face 14. A T-nut-shaped fixing member 28 is loosely fitted in the T-sectioned groove 15.

The rear stepped-up portion 25B of the work-engaging member 25 has a vertical through bolt bore 29 perpendicular to its seating 27. A fixing bolt 30 is set from above through the bolt bore 29 with its leg 30b screwed into a threaded bore 31 of the nut-shaped fixing member 28 and with its head 30a in a head accommodating hole 29a. It is so arranged with the underside of the bolt's head 30a in contact with an annular head receiving face 32 of the head accommodating hole 29a. The fixing member 28 is pulled up toward the work-engaging member 25 as the fixing bolt 30 is fastened so as to have the thicker wall portions on both sides of the T-sectioned groove 15 clamped between the fixing member 28 and the seating face 27 of the work-engaging member 25. The work-engaging member 25 is thereby clamped to the mounting face 14.

A clamping block 33 has its front end face formed as a clamping face 34 and its rear end face formed as a rearward and downward facing driven wedge face 35. Between clamping face 34 and driven wedge face 35, there is an oval-sectioned clamp bolt bore 36 which is a vertical loose bore with its longer axis along the longitudinal direction. The upper portion of this loose bore 36 has an oval-sectioned clamp bolt head accommodating hole 36a.

This clamping block 33 is disposed in front of the driving wedge face 26 and above the stepped down portion 25A of the work-engaging member 25. Its driven wedge face 35 is in contact with the driving wedge face 26 of the work-engaging member 25.

When the clamp bolt 37 is set from above through the abovementioned oval-sectioned loose clamp bolt bore 36, a clamp bolt bore 38 provided under it through the work-engaging member 25 with a play 39 in the former clamp bolt head 37a is positioned in the clamp bolt head accommodating hole 36a, and its leg 37b is screwed into a threaded bore for clamping 40 in the fixing member 28. The underside of the head 37a of the clamping bolt 37 is caused to press against a fastening face 41 through a washer 42. The clamping block 33 is forced down by the clamp bolt's head 37a and at the same time is driven forward as its driven wedge face 35 is slid down on the mating driving wedge face 26. There is also a slanted spring accommodating hole 43 extending from the work-engaging member 25 into the clamping block 33, and in it, a restitution spring 44 is loaded so that the clamping block 33 is urged toward the rear and upward so that the clamp will be released with the driven wedge face 35 kept in contact with the mating driving wedge face 26 as the clamping bolt is unfastened.

The front end portion of the work-engaging member 25 is formed to project beyond the clamping face 34 of the clamping block 33. The workpiece carrying portion 23 has a topside constituting a work carrying face 23a which is higher than the seating face 27.

The positioning block 16 is fixed by a pair of fixing bolts 17 screwed into a fixing member 45 which is fitted in each T-sectioned groove 15. Its workpiece-carrying portion 24 is raised above the seating face 27 for setting each workpiece W bridge-like on it and its counterpart 23 of the clamping device 18. This avoids damage to the mounting face 14 by the drill tip when the workpiece W is bored.

Figure 7:
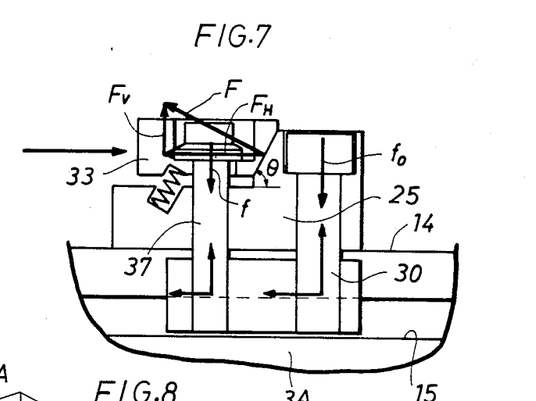
FIG. 7 is an explanatory sketch showing the clamping force developed by the clamp of the present invention.

Now, referring to FIG. 7, the dynamic mechanism of the clamping device 18 is described.

When a fastening force f is applied to the clamping bolt 37, the clamping block 33 is subjected to a reaction force F from. The wedge face 26, the vertical component $F_V$ of this reaction force F is equivalent to the fastening force f and its horizontal component $F_H$ is roughly equivalent to the horizontal clamping force.

That is, by inputting a fastening force f, a clamping force $F_H$ ($F_H = F_V \times \tan \theta = f \times \tan \theta$) can be output. When $\theta$ is set at more than 45°, the clamping force $F_H$ is larger than the fastening force f; it is advisable to set $\theta$ between approximately 65°~75°.

The clamping block 33 is driven for clamping forward and downward parallel to the driving wedge surface 26 to clamp the workpiece W downward as well. Hence, the workpiece W is ensured against lifting as it is clamped.

Furthermore, the work-engaging member 25 is retained not only by the frictional force due to the fastening force $f_o$ of the fixing bolt 30, but also by the frictional force due to the fastening force f of the clamping bolt 37. Hence, the work-engaging member 25 can be clamped to the mounting face 14 with a greater force than by the fixing bolt 30 alone.

Figure 8:
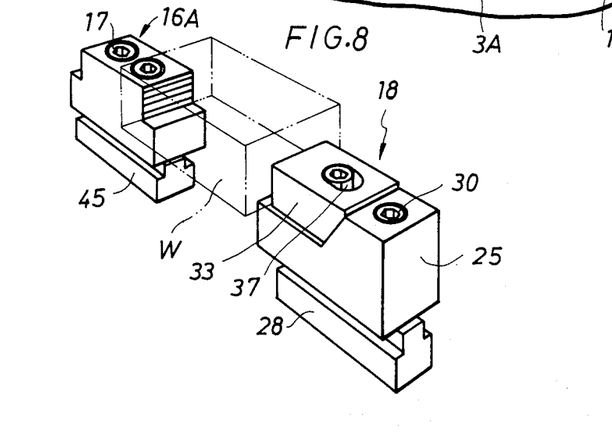
FIG. 8 is a perspective view of the clamp and a positioning block.

As shown in FIG. 8, the abovementioned positioning block 16 need not necessarily be continuous laterally but can be provided as individual positioning blocks 16A, each being opposite from each set of clamping device 18.

Further, the clamping device of the present invention, which is mounted on the work-clamp pallet in the preferred embodiment shown, can also be mounted direct on the work table of a machine tool by the aid of the T-sectioned grooves provided therein. It is also possible to apply it to machines other than machine tools for clamping various workpieces and/or tools.

The clamping device described in the above preferred embodiment can be partially modified as follows.

Figure 9:
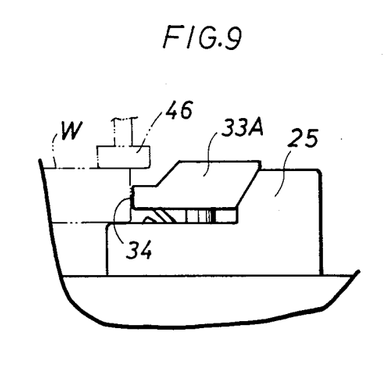
FIG. 9 is a side view of a first alternative embodiment of the clamp.

(1) As shown in FIG. 9, the upper part of the front end portion of the clamping blocks 33A is trimmed off to make it thinner like a clamping block 33A. This enables a relatively flat workpiece W to be machined by the use of a cutter 46.

Figure 10:
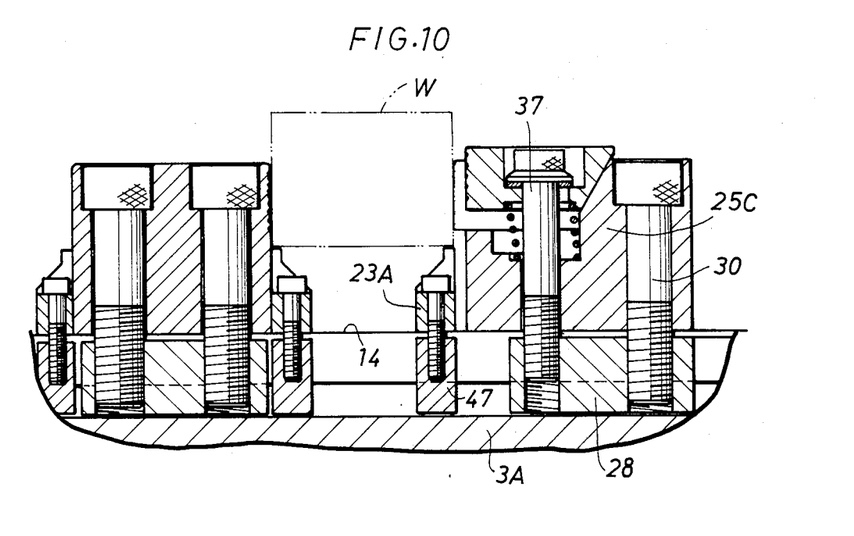
FIG. 10 is a vertical sectional side view of a second alternative embodiment of the clamp and positioning block.

(2) As shown in FIG. 10, a raised workpiece carrying part 23A is formed separate from a work-engaging member 25C and is secured to the mounting face 14 in front of the latter by the use of a T-nut-shaped fixing member 47.

In this case, the raised work carrying part 23A can be freely designed with its height to be optimum for the shape and construction of the work W. Especially when the work-engaging member 25 is designed as a tall one, workpieces W varying in height, from a flat one to a tall one, can be clamped by properly adjusting the height of the independent raised workpiece-carrying part 23A.

Figure 11:
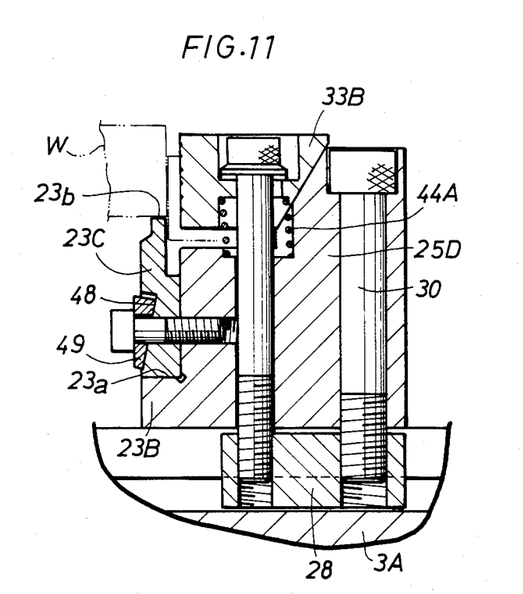
FIG. 11 is a vertical sectional side view of a third alternative embodiment of the clamp.

(3) As shown in FIG. 11, an independent workpiece-carrying attachment 23C may be placed on a raised workpiece carrying portion 23B integral with a work-engaging member 25D to vary the height and/or longitudinal position of a workpiece-carrying face 23b.

In this case, the workpiece-carrying attachment 23C is arranged to be pressed downward by a washer 49 with its slanted seating face 48.

A restitution spring 44A is loaded compressed with its upper end on the side of a clamping block 33B shifted forward against its lower end on the side of a workpiece-engaging member 25D so as to urge the clamping block 33B upward to the rear.

Figure 12:
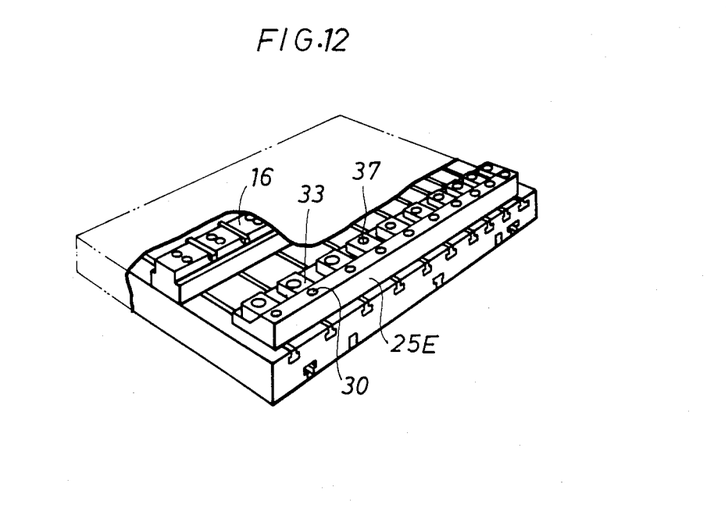
FIG. 12 is a partial perspective view of a work-clamp pallet equipped with a fourth alternative embodiment of the clamp.

(4) As shown in FIG. 12, a laterally extended work-engaging member 25E has provided in it equally spaced the individual sets of fixing bolt bores 29, clamping blocks 33, clamping bolts 37 and raised workpiece-carrying parts 23.

Figure 13:
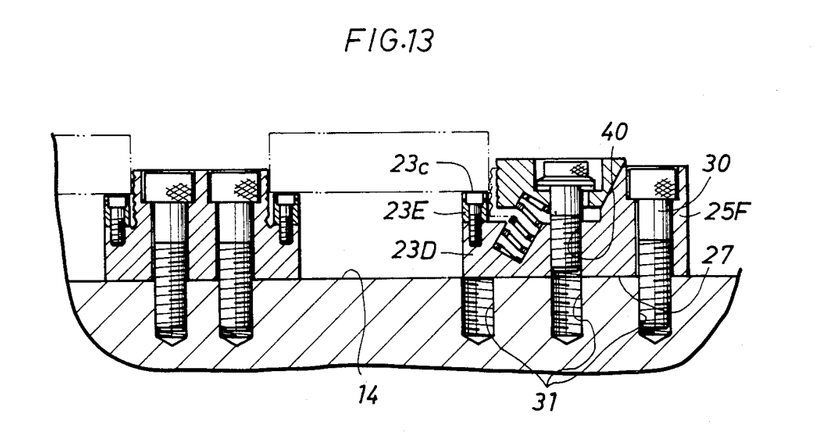
FIG. 13 is a vertical sectional side view of a fifth alternative embodiment of the clamp and positioning block.

(5) As shown in FIG. 13, T-sectioned grooves in the mounting face 14A are dispensed with and the fixing bolt bore 31 is provided instead so that a work-engaging member 25F is secured to the mounting face 14 by means of the fixing bolt 30 alone. The leg of the clamping bolt 30 is screwed into the threaded bore 40 in the work-engaging member 25F. Also, it is possible to place a workpiece-carrying attachment 23E on a raised workpiece-carrying portion 23D to raise a workpiece-carrying face 23C.

Figure 14:
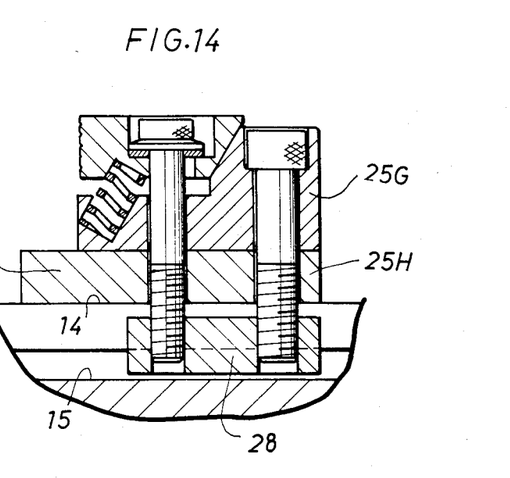
FIG. 14 is a vertical sectional side view of a sixth alternative embodiment of the clamp.

(6) As shown in FIG. 14, a supporting block 25H is inserted under a work-engaging member 25G. Its front end portion is used as a raised workpiece carrying portion 23F.

(7) It is also possible to form the driving wedge face of the work-engaging member as a partial concave truncated conical face and the driven wedge face of the clamping block as a partial convex truncated conical face so as to allow slight swinging of the clamping block in a horizontal plane.

What we claim is:

1. A slide wedge clamp for engagement with a mounting plate having a T-sectioned groove member, a clamping block, a fixing bolt, a clamping bolt, a T-nut-shaped fixing means and a raised workpiece-carrying portion; wherein said work-engaging member has a forward end and a rearward end, a forward and upward faced driving wedge face located between said forward end and said rearward end, a stepped-down portion forward of said face, a stepped-up portion rearward of said face, an underside portion constituting a seating face arranged to be seated on a mounting face in a mounting plate, a fixing bolt bore in the rear stepped-up portion perpendicular to the seating face; the upper portion of the peripheral wall of the fixing bolt bore being stepped outward from the lower portion of the peripheral wall of the fixing bolt bore to constitute a bolt head receiving face;

a T-nut-shaped fixing means for engagement with a T-shaped groove in a mounting plate, said T-nut-shaped fixing means having a threaded bore for engagement with said fixing bolt and a threaded bore for engagement with said clamping bolt;

said fixing bolt being arranged to be set from above said work engaging member through said fixing bolt bore into said threaded bore for engagement with said fixing bolt provided in said T-nut-shaped fixing means; the head of said fixing bolt being arranged to be in contact with the bolt head receiving face so that the work engaging member is securable to a mounting plate; said raised workpiece-carrying portion being located on the forward end side of the work-engaging member and being an integral part of the work-engaging member; the topside of the workpiece-carrying portion constituting a workpiece-carrying surface; said workpiece-carrying surface being higher than said seating face;

said clamping block having a forward end face constituting a clamping face, a rear end face constituting a rearward and downward faced driven wedge face, a vertical clamp bolt bore having a diameter which allows play between said clamping bolt and said clamp bolt bore when said clamping bolt is placed in said clamp bolt bore, the upper portion of the peripheral wall of the clamp bolt bore being stepped outward from the lower portion of the peripheral wall of the clamp bolt bore to provide a fastening face; said clamping block being disposed above the stepped-down portion of the work-engaging member and forward of said driving wedge face; said clamping face being retracted rearward of said raised workpiece-carrying portion, said driven wedge face being in contact with said driving wedge face;

said clamping bolt being arranged to be set from above said clamping block through said clamp bolt bore and beyond said seating face into said T-nut-shaped fixing means, with the head of said clamping bolt in contact with said fastening face so that when a fastening force is applied to the clamping bolt, the head of the clamping bolt forces down the clamping block to slide the driven wedge face of said clamping block down the driving wedge face of said work-engaging member thereby driving the clamping block forward for clamping.

2. A slide wedge clamp as recited in claim 1 further comprising a restitution spring which is loaded between the work engaging member and the clamping block to urge the clamping block toward the driving wedge face.

3. A slide wedge clamp as recited in claim 1, wherein said work-engaging member is formed as a laterally extended member having provided therein equally spaced a plurality of sets of said fixing bolt bore, clamping block, clamping bolt and raised workpiece carrying portion.

4. A slide wedge clamp as recited in claim 3, wherein said plurality of clamping blocks are formed independent on one another.

5. A slide wedge clamp as recited in claim 3, wherein said plurality of clamping blocks are formed as a laterally extended integral body.

6. A slide wedge clamp as recited in claim 3, wherein said plurality of raised workpiece-carrying portions are formed as a laterially extended integral body.

* * * * *